US006806353B2

(12) United States Patent
Zhang et al.

(10) Patent No.: US 6,806,353 B2
(45) Date of Patent: *Oct. 19, 2004

(54) BIODEGRADABLE PLANT PROTEIN COMPOSITES AND RELATED METHODS

(75) Inventors: Jinwen Zhang, Dracut, MA (US); Perminus Mungara, Ames, IA (US); Jay-Lin Jane, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 127 days.

This patent is subject to a terminal disclaimer.

(21) Appl. No.: 09/976,346

(22) Filed: Oct. 12, 2001

(65) Prior Publication Data

US 2003/0078323 A1 Apr. 24, 2003

Related U.S. Application Data

(63) Continuation-in-part of application No. 09/564,005, filed on May 3, 2000, now Pat. No. 6,632,925.
(60) Provisional application No. 60/132,494, filed on May 4, 1999.
(51) Int. Cl.[7] .......................... A61K 35/78; C07K 14/00
(52) U.S. Cl. .......................... 530/370; 530/350; 514/2; 525/57; 528/354
(58) Field of Search ................................ 530/370, 350; 514/2; 525/57; 528/354

(56) References Cited

U.S. PATENT DOCUMENTS 6,214,907 B1 * 4/2001 Tomka ........................ 524/47

OTHER PUBLICATIONS

Lin Li, et al., The Effects of Specific Interactions on the Surface Structure and Composition of Miscible Blends of Poly(Vinyl Alcohol) and Poly(N–Vinyl–2–Pyrrolidone), *Polymer*, vol. 39, No. 11, pp. 2355–2360, (1998).
Sue, H.J., et al., "Morpholpgu and Mechanical Behaviour of Engineering Soy Plastics", *Polymer*, vol. 38, No. 20, pp. 5035–5040, (1997).
Otaigbe, Joshua U., et al., "Bioabsorbable Soy Protein Plastic Composites: Effect of Polyphosphate Fillers on Water Absorption and Mechanical Properties", *Journal of Environmental Polymer Degradation*, vol. 5, No. 4, (1998).
Spence, K.E., "Soil and Marine Biodegradation of Protein–Starch Plastics", *American Chemical Society*, pp. 149–158, (1996).
Paetau, I., et al., "Biodegradable Plastic Made from Soybean Products. II. Effects of Cross–Linking and Cellulose Incorporation on Mechanical Properties and Water Absorption", *Journal of Environmental Polymer Degradation*, vol. 5, No. 4, (1998).
Jane, J.L., et al., "Degradable Plastics Made from Starch and Protein", *Biodegradable Polymers and Packaging, TECHNOMIC Publication*, pp. 63–73, (1993).
Raghunath, K. et al., "Grafting of Poly (Vinyl Pyrrolidone) Onto Gelatin and Ists Application as Synthetic Plasma Expander", *European Polymer*, vol. 21, No. 2, pp. 195–199, (1985).

* cited by examiner

*Primary Examiner*—Christopher S. F. Low
*Assistant Examiner*—Chih-Min Kam
(74) *Attorney, Agent, or Firm*—McKee, Voorhees & Sease, P.L.C.

(57) ABSTRACT

A biodegradable plant protein composite is described. The composite includes a plant protein, which is preferably soy protein, and a polylactide. The composite also preferably includes a compatibilizer, a cross-linking agent, and a plasticizer. The composites of this invention offer the advantages of being water resistant and biodegradable.

22 Claims, 10 Drawing Sheets

EFFECTS OF COMPOSITION ON PHYSICAL PROPERTIES OF SPI[1]/PVA[2]/PVP[3] FOAM SHEETS[4]

| SAMPLE | PVA/PVP (PARTS) | DENSITY (g/cc) | TENSILE STRENGTH (MPa)[5] | ELONGATION (AT BREAK, %)[5] | YOUNG'S MODULUS (MPa)[5] |
|---|---|---|---|---|---|
| 1 | 0/0 | 0.53 | 6.47 ± 0.56 | 7.67 ± 1.61 | 164.90 ± 49.60 |
| 2 | 2/0 | 0.61 | 4.70 ± 0.37 | 23.39 ± 5.09 | 125.30 ± 33.33 |
| 3 | 3/0 | 0.47 | 5.72 ± 0.55 | 28.13 ± 12.05 | 153.00 ± 33.43 |
| 4 | 2/2 | 0.47 | 7.61 ± 0.64 | 8.48 ± 0.82 | 178.70 ± 25.40 |
| 5 | 10/3 | 0.52 | 6.95 ± 0.75 | 15.22 ± 3.46 | 161.00 ± 24.20 |

[1] SPI: SOY PROTEIN ISOLATE
[2] PVA: POLY(VINYL ALCOHOL)
[3] PVP: POLY(VINYL PYRROLIDONE)
[4] FORMULATION: 100 PARTS SPI, 80 PARTS WATER, 25 PARTS GLYCEROL, AND 1 PART SODIUM TRIPOLYPHOSPHATE, (ALL BASED ON 100 PARTS DRY WEIGHT SOY PROTEIN)
[5] MEAN ± STANDARD DEVIATION.

Fig. 1

EFFECTS OF PVA CONCENTRATION ON PHYSICAL PROPERTIES OF SPI[1]/PVA[2]/PVP[3] FOAM SHEETS[4]

| SAMPLE | PVA/PVP (PARTS) | DENSITY (g/cc) | TENSILE STRENGTH (MPa)[5] | ELONGATION (AT BREAK, %)[5] | YOUNG'S MODULUS (MPa)[5] |
|---|---|---|---|---|---|
| 1 | 0 | 0.45 | 4.96 ± 0.88 | 3.69 ± 0.75 | 205.7 ± 38.2 |
| 2 | 10/2 | 0.54 | 6.40 ± 0.68 | 4.2 ± 0.56 | 243.6 ± 38.7 |
| 3 | 20/2 | 0.56 | 7.54 ± 0.82 | 9.17 ± 2.86 | 257.7 ± 51.10 |
| 4 | 30/2 | 0.52 | 7.65 ± 0.68 | 6.72 ± 1.55 | 266.4 ± 27.4 |
| 5 | 40/2 | 0.53 | 8.04 ± 0.48 | 11.61 ± 3.08 | 281.1 ± 27.9 |

[1] SPI: SOY PROTEIN ISOLATE
[2] PVA: POLY(VINYL ALCOHOL)
[3] PVP: POLY(VINYL PYRROLIDONE)
[4] FORMULATION: 100 PARTS SPI, 80 PARTS WATER, 20 PARTS GLYCEROL, 0.5 PARTS POTASSIUM SORBATE (PRESERVATIVE), AND 1 PART SODIUM TRIPOLYPHOSPHATE, (ALL BASED ON 100 PARTS DRY WEIGHT SOY PROTEIN)
[5] MEAN ± STANDARD DEVIATION.

Fig. 2

| \multicolumn{6}{l}{EFFECTS OF OCTENYLDECENE SUCCINIC ANHYDRIDE ON PHYSICAL PROPERTIES OF SPI[1]/PVA[2]/PVP[3] FOAM SHEETS[4]} |
|---|---|---|---|---|---|
| SAMPLE | PVA/PVP | ODSA[5] | DENSITY (g/cc) | TENSILE STRENGTH (MPa)[6] | ELONGATION (AT BREAK, %)[6] | YOUNG'S MODULUS (MPa)[6] |
| 1 | 0 | 0 | 0.50 | 6.30 ± 4.02 | 4.02 ± 0.61 | 193.7 ± 25.4 |
| 2 | 10/2 | 2 | 0.51 | 6.21 ± 0.61 | 5.28 ± 0.35 | 141.2 ± 35.5 |
| 3 | 20/2 | 2 | 0.55 | 6.52 ± 0.51 | 12.93 ± 3.09 | 190.5 ± 52.40 |
| 4 | 30/2 | 2 | 0.52 | 6.61 ± 0.40 | 14.15 ± 3.10 | 151.0 ± 20.4 |
| 5 | 40/2 | 2 | 0.45 | 6.43 ± 0.53 | 11.39 ± 2.68 | 170.10 ± 34.57 |

[1] SPI: SOY PROTEIN ISOLATE
[2] PVA: POLY(VINYL ALCOHOL)
[3] PVP: POLY(VINYL PYRROLIDONE)
[4] FORMULATION: 100 PARTS SPI, 80 PARTS WATER, 20 PARTS GLYCEROL, 0.5 PARTS POTASSIUM SORBATE (PRESERVATIVE), AND 1 PART SODIUM TRIPOLYPHOSPHATE, (ALL BASED ON 100 PARTS DRY WEIGHT SOY PROTEIN)
[5] ODSA: OCTENYLDECENE SUCCINIC ANHYDRIDE
[6] MEAN ± STANDARD DEVIATION.

Fig. 3

| \multicolumn{6}{l}{EFFECTS OF GLYCEROL CONCENTRATION ON PHYSICAL PROPERTIES OF SPI[1]/PVA[2]/PVP[3] FOAM SHEETS[4]} |
|---|---|---|---|---|---|
| GLYCEROL (PARTS) | PVA/PVP | DENSITY (g/cc) | TENSILE STRENGTH (MPa) | ELONGATION (AT BREAK, %) | YOUNG'S MODULUS (MPa) |
| BLANK | 0/0 | 0.46 | 5.86 ± 0.38 | 11.54 ± 2.41 | 158.8 ± 39.6 |
| 20 | 10/3 | 0.44 | 6.57 ± 0.55 | 16.33 ± 0.60 | 162.7 ± 33.4 |
| 25 | 10/3 | 0.47 | 4.89 ± 0.33 | 37.75 ± 5.08 | 125.2 ± 26.6 |
| 30 | 10/3 | 0.47 | 3.96 ± 0.24 | 65.52 ± 2.42 | 90.62 ± 15.12 |

[1] SPI: SOY PROTEIN ISOLATE
[2] PVA: POLY(VINYL ALCOHOL)
[3] PVP: POLY(VINYL PYRROLIDONE)
[4] FORMULATION: 100 PARTS SPI, 80 PARTS WATER, 1 PART SODIUM TRIPOLYPHOSPHATE, (ALL BASED ON ON 100 PARTS DRY WEIGHT SOY PROTEIN). BLANKS CONTIAN 20 PARTS GLYCEROL.
[5] MEAN ± STANDARD DEVIATION.

Fig. 4

| EFFECTS OF GELATIN ON THE PHYSICAL PROPERTIES OF SPI[1]/PVA[2]/PVP[3] FOAM SHEETS[4] | | | | | |
|---|---|---|---|---|---|
| SAMPLE | PVA/PVP (PARTS) | GELATIN (PARTS) | DENSITY (g/cc) | TENSILE STRENGTH (MPa) | ELONGATION (AT BREAK, %) | YOUNG'S MODULUS (MPa) |
| 1 | 0 | 0 | 0.46 | 5.86 ± 0.38 | 11.54 ± 2.41 | 158.8 ± 39.6 |
| 2 | 10/3 | 0 | 0.44 | 6.57 ± 0.55 | 16.33 ± 0.60 | 162.7 ± 33.4 |
| 3 | 10/3 | 6 | 0.43 | 7.11 ± 0.48 | 14.42 ± 1.48 | 170.8 ± 37.8 |
| 4 | 10/3 | 10 | 0.52 | 7.47 ± 0.30 | 18.81 ± 6.06 | 162.5 ± 16.2 |

[1] SPI: SOY PROTEIN ISOLATE
[2] PVA: POLY(VINYL ALCOHOL)
[3] PVP: POLY(VINYL PYRROLIDONE)
[4] FORMULATION: 100 PARTS SPI, 80 PARTS WATER, 20 PARTS GLYCEROL, 0.5 PARTS POTASSIUM SORBATE (PRESERVATIVE), AND 1 PART SODIUM TRIPOLYPHOSPHATE, (ALL BASED ON 100 PARTS DRY WEIGHT SOY PROTEIN)
[5] MEAN ± STANDARD DEVIATION.

Fig. 5

EFFECTS OF PROCESSING AIDES ON PHYSICAL PROPERTIES OF SPI[1]/PVA[2]/PVP[3] FOAM SHEETS[4]

| SAMPLE (0.5 PARTS) | PVA/PVP | DENSITY (g/cc) | TENSILE STRENGTH (MPa) | ELONGATION (AT BREAK, %) | YOUNG'S MODULUS (MPa) |
|---|---|---|---|---|---|
| BLANK | 0 | 0.44 | 2.96 ± 0.20 | 42.20 ± 5.84 | 56.37 ± 8.65 |
| NaCl[6] | 2/1 | 0.49 | 3.63 ± 0.32 | 52.48 ± 12.76 | 91.84 ± 17.62 |
| $Na_2SO_3$[6] | 2/1 | 0.51 | 3.50 ± 0.36 | 60.88 ± 6.25 | 76.18 ± 11.37 |
| CaSt[6] | 2/1 | 0.63 | 3.88 ± 0.28 | 56.80 ± 9.58 | 86.77 ± 35.12 |
| ZnSt[6] | 2/1 | 0.59 | 3.35 ± 0.07 | 48.59 ± 7.81 | 68.11 ± 9.32 |
| SDS[6] | 2/1 | 0.53 | 3.57 ± 0.34 | 62.00 ± 7.88 | 104.60 ± 26.54 |
| UNIFLEX[6] | 2/1 | 0.60 | 3.06 ± 0.16 | 50.22 ± 2.99 | 73.49 ± 23.88 |
| Int-38H[6] | 2/1 | 0.56 | 3.24 ± 0.40 | 50.42 ± 8.22 | 85.43 ± 25.50 |
| Int66HS[6] | 2/1 | 0.61 | 3.95 ± 0.27 | 57.64 ± 6.79 | 88.11 ± 15.80 |

[1] SPI: SOY PROTEIN ISOLATE
[2] PVA: POLY(VINYL ALCOHOL)
[3] PVP: POLY(VINYL PYRROLIDONE)
[4] FORMULATION: 100 PARTS SPI, 80 PARTS WATER, 20 PARTS GLYCEROL, 0.5 PARTS POTASSIUM SORBATE (PRESERVATIVE), AND 1 PART SODIUM TRIPOLYPHOSPHATE, (ALL BASED ON 100 PARTS DRY WEIGHT SOY PROTEIN)
[5] MEAN ± STANDARD DEVIATION.
[6] NaCl= SODIUM CHLORIDE, $Na_2SO_3$= SODIUM SULFITE, CaSt= CALCIUM STEARATE, ZnSt= ZINC STEARATE SDS= SODIUM DODECYL SULFATE, UNIFLEX= COMMERCIAL LUBRICANT FROM UNION CAMP COMPANY, INT-38H= INTERNAL LUBRICANT FROM AXEL COMPANY, INT-66HS= INTERNAL LUBRICANT FROM AXEL COMPANY

Fig. 6

| EFFECTS OF FLAVORING AGENTS ON PHYSICAL PROPERTIES OF SPI[1]/PVA[2]/PVP[3] FOAM SHEETS[4] | | | | | | |
|---|---|---|---|---|---|---|
| SAMPLE | FLAVORING AGENT | PVA/PVP | DENSITY (g/cc) | TENSILE STRENGTH (MPa) | ELONGATION (AT BREAK, %) | YOUNG'S MODULUS (MPa) |
| 1 | 0 | 3/2 | 0.42 | 5.45 ± 0.80 | 10.54 ± 2.47 | 172.40 ± 31.6 |
| 2 | 0 | 3/2 | 0.47 | 5.72 ± 0.55 | 28.13 ± 12.05 | 153.00 ± 33.43 |
| 3 | LEMON | 3/2 | 0.39 | 4.92 ± 0.83 | 10.97 ± 1.39 | 136.10 ± 19.63 |
| 4 | ALMOND | 3/2 | 0.38 | 5.18 ± 0.95 | 13.31 ± 1.90 | 137.20 ± 24.81 |

[1] SPI: SOY PROTEIN ISOLATE
[2] PVA: POLY(VINYL ALCOHOL)
[3] PVP: POLY(VINYL PYRROLIDONE)
[4] FORMULATION: 100 PARTS SPI, 80 PARTS WATER, 20 PARTS GLYCEROL, 0.5 PARTS POTASSIUM SORBATE (PRESERVATIVE), AND 1 PART SODIUM TRIPOLYPHOSPHATE, (ALL BASED ON 100 PARTS DRY WEIGHT SOY PROTEIN)
[5] MEAN ± STANDARD DEVIATION.
LEMON AND ALMOND FLAVORING AGENTS= 1 PART EACH

*Fig. 7*

| EFFECTS OF COLORANTS ON PHYSICAL PROPERTIES OF SPI[1]/PVA[2]/PVP[3] FOAM SHEETS[4] | | | | | | |
|---|---|---|---|---|---|---|
| SAMPLE | COLORANT | PVA/PVP | DENSITY (g/cc) | TENSILE STRENGTH (MPa) | ELONGATION (AT BREAK, %)[5] | YOUNG'S MODULUS (MPa) |
| 1 | 0 | 0/0 | 0.42 | 5.45 ± 0.80 | 10.54 ± 2.47 | 172.40 ± 31.6 |
| 2 | 10/3 | 3/2 | 0.47 | 5.72 ± 0.55 | 28.13 ± 12.05 | 153.00 ± 33.43 |
| 3 | PHTHALOCYANINE[6] | 3/2 | 0.59 | 4.30 ± 0.45 | 20.84 ± 5.0 | 111.30 ± 25.50 |
| 4 | PHTHALOCYANINE GREEN[7] | 3/2 | 0.59 | 4.47 ± 0.33 | 23.06 ± 12.37 | 128.80 ± 20.54 |

[1] SPI: SOY PROTEIN ISOLATE
[2] PVA: POLY(VINYL ALCOHOL)
[3] PVP: POLY(VINYL PYRROLIDONE)
[4] FORMULATION: 100 PARTS SPI, 80 PARTS WATER, 20 PARTS GLYCEROL, 0.5 PARTS POTASSIUM SORBATE (PRESERVATIVE), AND 1 PART SODIUM TRIPOLYPHOSPHATE, (ALL BASED ON 100 PARTS DRY WEIGHT SOY PROTEIN)
[5] MEAN ± STANDARD DEVIATION.
[6] PHTHALOCYANINE (BLUE/GREEN) = 0.05 PARTS
[7] PHTHALOCYANINE GREEN (GREEN) = 0.05 PARTS

*Fig. 8*

EFFECTS OF MOLDING TEMPERATURE ON MECHANICAL PROPERTIES OF COMPRESSION MOLDED SOY PROTEIN PLASTICS

BIODEGRADABLE PLANT PROTEIN COMPOSITES AND RELATED METHODS

CROSS-REFERENCE TO RELATED APPLICATION

This application is a continuation-in-part of U.S. application Ser. No. 09/564,005 filed May 3, 2000, now U.S. Pat. No. 6,632,925, which claims benefit of U.S. Provisional Application Serial No. 60/132,494 filed May 4, 1999.

FIELD OF THE INVENTION

This invention relates to the utilization of blends of plant protein with poly(lactic acid) (or polylactide, PLA) for biodegradable plastics. This invention also relates to the utilization of blends of plant protein with polycaprolactone and modified poly(ethylene terephthalate) for biodegradable plastics. The invention also relates to the utilization of blends of plant protein with poly(vinyl alcohol) and N-vinyllactam polymers.

BACKGROUND OF THE INVENTION

The majority of plastics are petroleum-based, and therefore non-biodegradable. The vast amount of waste generated through use of traditional plastics is becoming a burden on local landfills. There is, therefore, a growing interest in using renewable resources to replace or partially replace petroleum-based plastics.

The main attractive features of soy protein-based plastics are their biodegradability and the fact that soy is an abundant renewable resource. In fact, soy protein polymers have been suggested as inexpensive and environmentally-friendly substitutes for use in: packing materials; insulation; dishware; utensils; clam shell containers; golf tees and other outdoor sporting goods. U.S. Pat. No. 5,523,293 to J. Jane and S. Wang, discloses compositions of soy protein-based biodegradable plastics which are said to be useful for molded materials. The formulation is generally composed of soy protein (SP) (or SP/starch), a carbohydrate filler, a reducing agent, a plasticizer, water, and optional additives. U.S. Pat. No. 5,665,152 to Sukh Bassi discloses the compositions of blends of grain protein (wheat gluten or corn gluten) with starch. The compositions are said to be useful for molded plastics. U.S. patent Ser. No. 5,710,190, there is disclosed a soy protein polymer comprising soy protein, a filler (polysaccharide material, i.e. starch, gum and cellulose-based materials), a foaming agent, and plasticizers.

There are several limitations for broad application of soy protein and starch plastics described previously. The main problems include environmental instability and poor water resistance. Moreover, the plastic products made from SP and starch become brittle when moisture is lost, despite retention of high tensile strength. In contrast, the mechanical properties of SP/starch plastics deteriorate upon exposure to slight moisture increases, such as a change in relative humidity.

Alternate solutions have been proposed to solve these problems, including chemical modification, coating and blending with synthetic polymers. Usually, the benefit of chemical modification of biopolymers is offset by the decrease in product biodegradation and the increase in cost. Furthermore, coated soy protein plastics have not proven economical compared to petroleum-based plastics. To make soy protein plastics more economical, researchers have resorted to blending biopolymers with synthetic polymers. U.S. Pat. No. 5,321,064 to U. Vaidya and M. Bhattacharya, discloses compositions of biodegradable plastics made by reactive blending of a synthetic polymer with a naturally-occurring biodegradable polymer. These synthetic polymers contain functional groups which can form covalent bonds between two polymers. In other aspects of the Vaidya patent, gluten and maleic anhydride-modified polycaprolactone was blended. The blend with polycaprolactone became quite soft when subjected to a temperature above 60° C.

Other alternatives have been discussed in Li et al. The effects of Specific Interactions on the Surface Structure and Composition of Miscible Blends of Poly(vinyl alcohol) and Poly(N-vinyl pyrrolidone). Polymer, 1998, 39(11) 2355 and Raghunath et al. Grafting of Poly(vinyl pyrrolidone) onto Gelatin and its Applications as Synthetic Plasma Expander. Eur. Polym. J. 1985, 21(2), 195.

Citation of the above documents is not intended as an admission that any of the foregoing is pertinent prior art. All statements as to the date or representation as to the contents of these documents is based on subjective characterization of information available to the applicant, and does not constitute any admission as to the accuracy of the dates or contents of these documents.

SUMMARY OF THE INVENTION

It is therefore an object of the present invention to provide soy protein plastics which have the advantage of being water resistant, biodegradable, wherein the biodegradation results in environmentally-inoffensive compounds.

It is a further object to provide biodegradable composites with added strength.

It is yet another object to provide biodegradable composites with added strength and water resistance.

It is an object to provide soy protein/polylactide composites.

It is also an object to provide soy protein/polylactide/compatibilizer composites.

It is a specific object to provide soy protein/polylactide/poly(2-ethyl-2-oxazoline) composites.

It is an object to provide soy protein/polycaprolactone and modified poly(ethylene terephthalate) composites.

It is a specific object to provide soy protein/polycaprolactone/modified poly(ethylene terephthalate)/poly(2-ethyl-2-oxazoline) composites.

It is also an object to provide plant protein/poly(vinyl alcohol)/N-vinyllactam polymer composites.

It is also a specific object to provide plant protein/poly(vinyl alcohol) and poly(N-vinyl pyrrolidone) polymer composites.

Finally, it is an object of the invention to provide methods of making the composites.

Definitions. For the purposes of the present invention, the following terms shall have the following meanings:

"Plant protein" means any compound comprising a protein (any compound comprising amino acids, including, for example, polypeptides, peptides and modifications of nascent proteins, such as glycosylations, or cleavage products), wherein the protein is or was derived from plant matter, including a full plant, or derivatives from seeds, leaves, stems, roots, or any other plant parts or extractions.

"Compatibilizer" means any compound capable of enhancing the interaction between a plant protein and a polylactide, a plant protein and a polycaprolactone and/or modified poly(ethylene terephthalate).

"Polylactide" means the compound described herein as "polylactide", as well as any compound which functions in the same way with the same result. For instance, modified polylactides, acids thereof (e.g. polylactic acid) or mimetopes are within the present definition.

"Polycaprolactone" means the compound described herein as "polycaprolactone", as well as any compound which functions in the same way with the same result. For instance, modified polycaprolactone, acids thereof, or mimetopes are within the present definition.

"Modified poly(ethylene terephthalate)" means the compound described herein as "poly(ethylene terephthalate)", as well as any compound which functions in the same way with the same result. For instance, modified poly(ethylene terephthalate), acids thereof or mimetopes are within the present definition.

BRIEF DESCRIPTION OF THE FIGURES

FIG. 1. Effects of composition on physical properties of SPI/PVA/PVP foam sheets FIG. 2. Effects of PVA concentration on physical properties of SPI/PVA/PVP foam sheets.

FIG. 3. Effects of octenyldecene succinic anhydride on physical properties of SPI/PVA/PVP foam sheets.

FIG. 4. Effects of glycerol concentration on physical properties of SPI/PVAIPVP foam sheets.

FIG. 5. Effect of gelatin on the physical properties of SPI/PVA/PVP foam sheets.

FIG. 6. Effect of processing aides on physical properties of SPI/PVA/PVP foam sheets.

FIG. 7. Effects of flavoring agents on physical properties of SPI/PVA/PVP foam sheets.

FIG. 8. Effects of colorants on physical properties of SPI/PVA/PVP foam sheets.

DETAILED DESCRIPTION OF THE INVENTION

Figure 9:
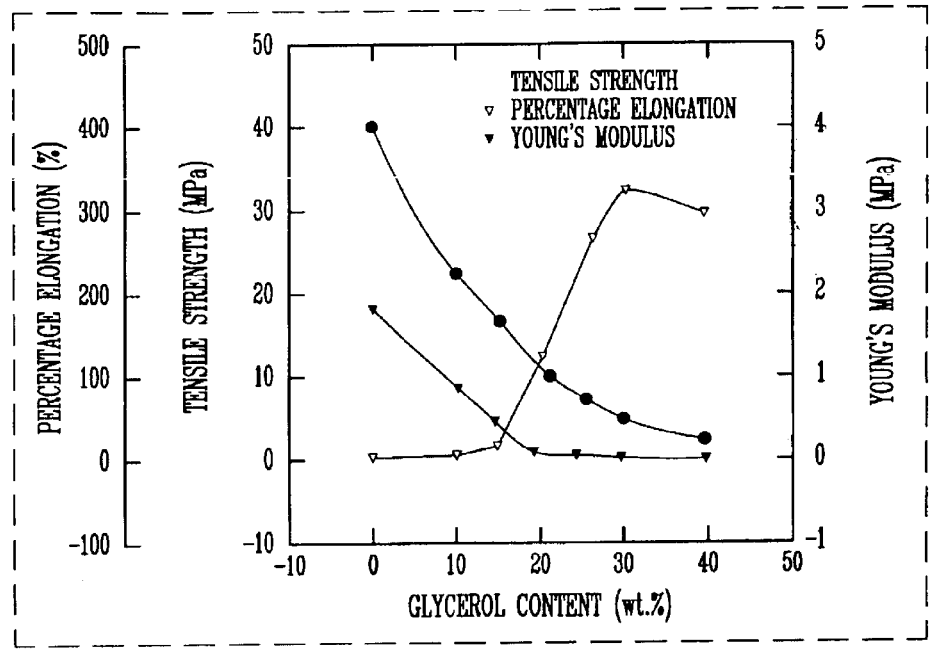
FIG. 9. Effects of glycerol content on physical properties of composites.

The present invention includes biodegradable composites, having a variety of components, said composite comprising: a plant protein component and a polylactide component. The composites can further comprise a compatibilizer component.

Preferred are composites wherein the parts by weight of the components are:

plant protein 5–90 parts polylactide 90–5 parts, and optionally, compatibilizer 0–10 parts These can be modified to include:

Water 6–15 parts

Plasticizer 0–10 parts

Of those composites, most preferred are those wherein the parts by weight of the components are:

plant protein 50–90 parts polylactide 50–10 parts, and optionally, compatibilizer 0–6 parts These can be modified to include:

Water 8–14 parts

Plasticizer 0–8 parts

Of course, composites as above, wherein the parts by weight are any within the ranges indicated are within the above preferred embodiments, including any combination or permutation of the above. The total should not exceed 100 parts.

The following table indicates sources for the components described in the present invention:

TABLE 1

| Component | Commercial Source(s) | de novo Synthesis |
|---|---|---|
| plant protein | Archer Daniels Midland "ADM" (Decatur IL) | Alkaline extraction of a defatted meal and acid precipitation. |
| polylactide | Cargill Dow Polymers (Minneapolis, MN) | As well known in the art: Polylactide is preferably synthesized by bulk polymerization of lactide in presence of a suitable catalyst, such as zinc and tin compounds, e.g. diethyl tin, stannous oxide and tetraphenyl tin. ie. W. Dittrich, R. C. Schulz, Angew Makromol. Chem., 15, 109 (1971). H. R. Kricheldorf, Polym. Bull. (Berlin), 14, 497 (1985). D. K. Gilding, A. M. Reed, Polymer, 20, 1459 (1979). U.S. 3976071 (1976), Dynatech Co., Inv., S.E. Sadek |
| Compatibilizer | Aldrich (Milwaukee, WI) | As well known in the art: Poly(2-ethyl-2-oxazoline) is obtained by ring-opening isomerization polymerization of 2-methyl-2-oxazoline initiated by methyl p-toluenesulfonate in acetonitrile. ie. S. Kobayashi, M. Kaku and T. Saegusa. Macromol., 21, 334 (1988). |

The protein component can be any known in the art, and be available as part of a larger formulation, such as an isolate with carbohydrates and fiber. Plant proteins which are within the scope of the present invention include any which are not water soluble, including, water-insoluble fractions from zein, corn gluten, wheat gluten, legumes, canola, sunflower, sorghum, and soybean. Any form of protein may be used; for instance, isolates, concentrates and flour are all acceptable forms of protein.

For example, soy protein may be in the form of a soy isolate containing at least 75 to 95% protein, a soy protein concentrate containing at least 50 to 70% protein, or soy flour containing at least 30 to 50% soy protein. Soy protein from soy isolates containing 95% protein, soy concentrates containing 70% protein and soy flour containing at least 50% protein are preferred. The soy protein isolate or concentrate may be prepared, for example, by alkaline extraction of a defatted meal and acid precipitation, a technique well-known and used routinely in the art. Soy protein is also commercially available, for example, as Promine R (Central Soya) which is a soy protein isolate having a protein content of approximately 95 wt-%. Other soy protein products are also available from Archer Daniels Midland, Decatur Ill., and Protein Technology, St. Louis, Mo. A particularly useful brand-named soy protein from ADM is PRO-Fam 646.

In this regard, commercial soy protein (soy protein isolate, or soy concentrate, or soy flour) always contains a certain amount of water (6–9%). Before blending with other polymers, it is optimal to formulate the soy protein first. For instance, water, plasticizer and other ingredients can be added in certain parts to 100 parts of dry soy protein. For example, if the moisture in a commercial soy protein is 6%, the measurement would be 106.4 g for 100 parts. At the blending step, the soy protein (again, soy protein dry weight based on the formulated soy protein) and polymer(s) compose of 100 parts, and, to this, certain parts of compatibilizer can be added. Generally, the more synthetic polymer used, the better the water resistance and processibility. However, since synthetic biodegradable polymers are usually much more expensive, it is best to use less of them and maintain good mechanical properties.

In other embodiments, there are provided composites which further include an effective amount of a plasticizing agent to impart flexibility to the material before, during, and after mixing, and to provide flexibility, elasticity, and processibility to the formed article. The plasticizer can be any known in the art, eg. polyols and higher molecular weight alcohols, for example glycerol, glycerol monoacetate, diglycerol, glycerol diacetate or triacetate, triethylene glycol, urea, diacetin sorbitol, sorbitan, mannitol, malitol, ethylene glycol, propylene glycol, polyvinyl alcohol, sodium cellulose glycolate, cellulose methyl ether, sodium alginate, sodium diethylsuccinate, triethyl citrate, polyethylene glycols, polypropylene glycols, polyethylene propylene glycols, 1,2,6-hexanetriol, triethylamine, and mixtures thereof, with glycerol and propylene glycol being preferred. For soy protein, a range of chemicals could be used as plasticizers including glycerol, (- and (-propylene glycol, caprolactone, some short chain hydroxyl alkanoic acids such as hydroxybutanoic acid and hydroxycaproic acid, some mono-sugars and their derivatives. For PLA and modified poly(ethylene terephthalate), tone polyol(s) (low molecular weight polycaprolactone) proved to be a good plasticizer. Epoxidized oil can also be used. Both are biodegradable.

Also preferred is a composite which further comprises a compatibilizer. Composites wherein the compatibilizer component is poly(2-ethyl-2-oxazoline) (PEOX) are preferred. Besides poly(2-methyl-2-oxazoline), other poly(2-alkyl-2-oxazoline), e.g., poly(2-propionyl-2-oxazoline), poly(2-phenyl-2-oxazoline), can also be used as compatibilizers for the blends of soy protein with PLA and poly(ethylene terephthalate). In addition, maleic anhydride grafted rubber, epoxy/hydroxyl functionalized polybutadiene can be used as good compatibilizers.

TABLE 2

Effect of a Compatibilizer on Properties of Soy Protein/PLA Blends
(Medium Shear)

|  | CP (parts) | Strength MPa | $\sigma_y$ MPa | P.E.Y. % | $\sigma_b$ MPa | P.E.B. % | Modulus MPa | Water uptake %, 2 h |
|---|---|---|---|---|---|---|---|---|
| SPI | 0 | 12.4 ± 2.0 | 12.1 ± 2.0 | 1.2 ± 0.1 | 12.4 ± 2.0 | 1.3 ± 0.1 | 1502 ± 16 | 18.2 ± 1.6 |
|  | 2 | 18.7 ± 1.7 | 18.5 ± 1.8 | 1.8 ± 0.2 | 18.7 ± 1.7 | 1.8 ± 0.2 | 1454 ± 42 | 14.1 ± 1.8 |
| SPC | 0 | 19.3 ± 0.6 | 19.0 ± 0.9 | 1.7 ± 0.1 | 19.3 ± 0.6 | 1.7 ± 0.1 | 1676 ± 83 | 15.1 ± 1.0 |
|  | 2 | 19.5 ± 0.3 | 19.2 ± 1.6 | 1.7 ± 0.1 | 19.5 ± 0.3 | 1.8 ± 0.1 | 1611 ± 116 | 17.2 ± 1.3 |
| SF | 0 | 12.8 ± 0.3 | 12.7 ± 0.3 | 2.4 ± 0.2 | 12.8 ± 0.3 | 2.5 ± 0.2 | 805 ± 30 | 12.5 ± 0.5 |
|  | 2 | 14.8 ± 0.3 | 14.7 ± 0.3 | 2.5 ± 0.1 | 14.8 ± 0.3 | 2.5 ± 0.2 | 864 ± 25 | 10.7 ± 0.4 |

SPI, SPC, SF: soy protein isolate, concentrate, and soy flour, respectively.
Glycerol was used as a plasticizer.
PLA: poly(lactic acid)
CP: compatibilizer, poly(2-ethyl-2-oxazoline)
$\sigma_y$: stress at yield point
$\sigma_b$: stress at break point
P.E.Y.: percentage elongation at yield point
P.E.B.: percentage elongation at break point Of course, those in the art recognize that other components, such as non-soy proteins, reducing agents, fillers, extenders, bleaching agents, coloring agents, flavorings, lubricants, preservatives, foaming agents, pH modifiers or other additives may be included in the present composite so as to improve or otherwise alter the end product, as desired. U.S. Pat. Nos. 5,523,293 and 5,710,190 describe such modifications, and are herein incorporated by reference.

Also provided by the present invention are methods for making biodegradable soy protein composites comprising: mixing soy protein, polylactide, a compatibilizer, a minimum amount of water, a plasticizer, and other additives, if desired; and subsequently extruding said mixture through a twin-screw extruder, at a temperature sufficient to make the composite extrudable. Preferred are methods wherein the temperature profile of the twin-screw extruder is 145° C. (zone next to die), 150–155° C. in the second zone, 140–145° C. in the third zone, 100° C. in the fourth zone, 75° C. (next to feeder). More preferred is a method as described wherein the screw speed is 60–70 rpm.

The composite components can be obtained as described previously. Extruders are produced under several brand names, such as Cincinnati Millicron and Wenger X-20. A suitable extruder can be obtained, for example, from List, Inc., Acton, Mass.

The temperatures used during this method can be any which allow appropriate flow of the materials, without losing the essential qualities of the composite. The extruder can be operated according to the manufacturer's instructions.

The present inventors have found that the various parameters described above may influence the processing and/or properties of soy protein-based plastics, including the use of plasticizers, processing conditions e.g. temperature, pressure, time, screw speed, draw speed etc., and the inclusion of various additives e.g. synthetic biodegradable polymers, lubricants, colorants, nucleating agents, chemical blowing agents, preservatives, etc.

Figure 10:
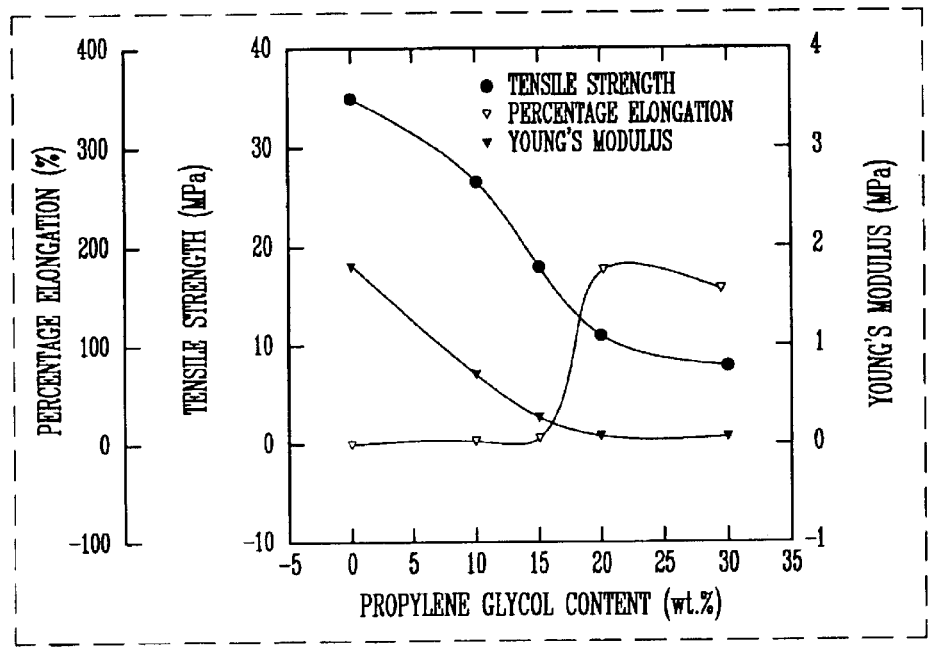
FIG. 10. Effects of propylene glycol content on physical properties of composites.

For instance, FIGS. 9 and 10 are graphs demonstrating the effect of various concentrations (0–50% by weight) of the plasticizers glycerol (FIG. 9) and propylene glycol (FIG. 10) on the physical properties of the composites of this invention. The graphs demonstrate a preferred glycerol content of between about 10–30% by weight and a preferred polyethylene glycol content of between about 15–20% by weight.

Figure 11:
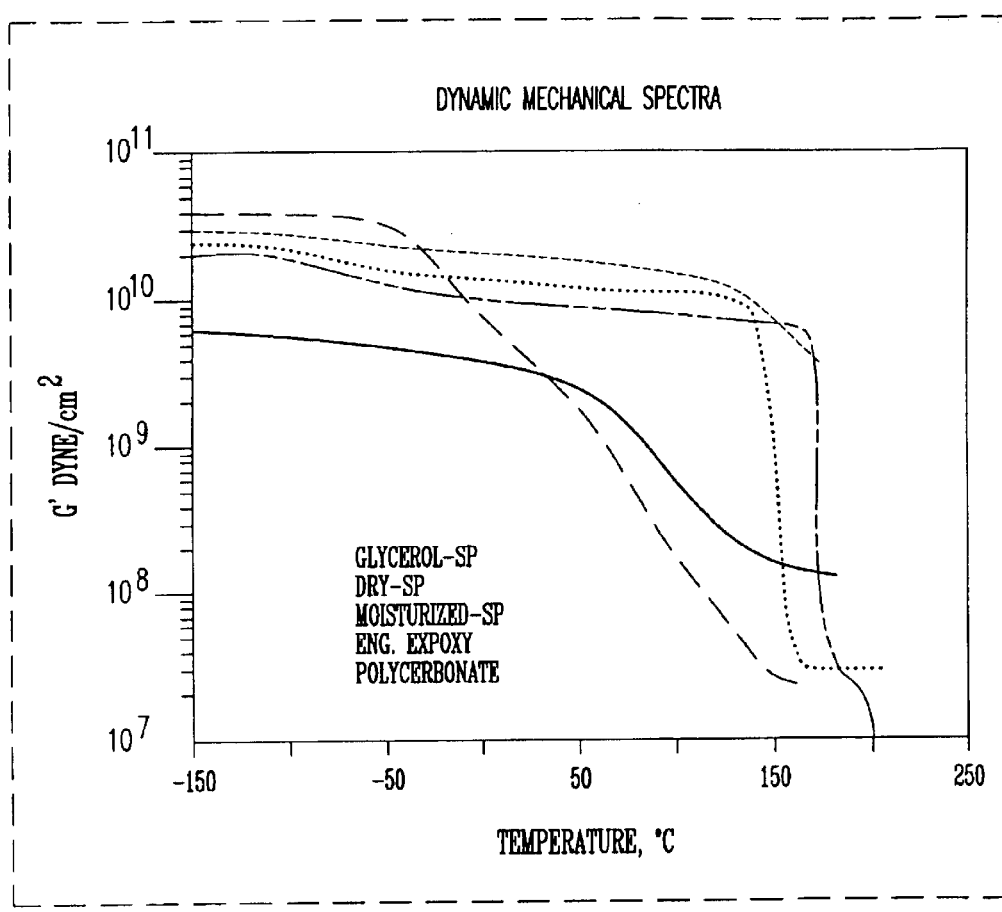
FIG. 11. Dynamic mechanical spectra of glycerol-soy protein in comparison to dry soy protein, moisturized soy protein, engineered epoxy and polycarbonate.
Figure 12:
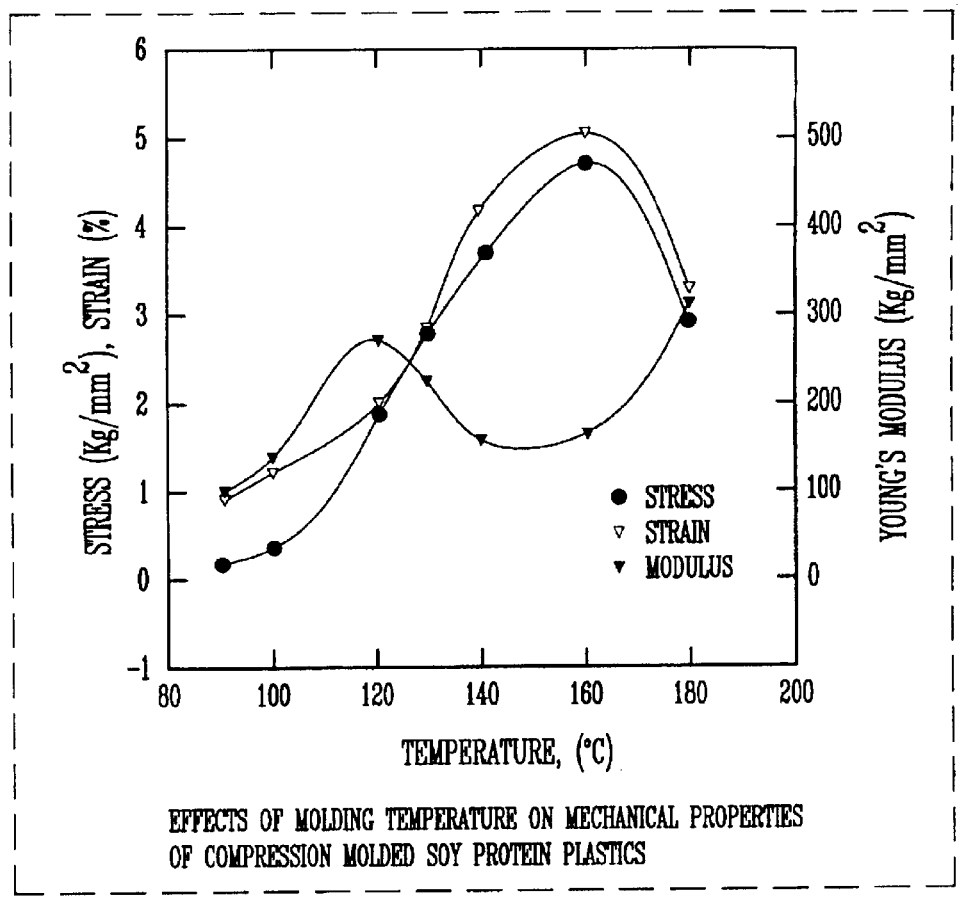
FIG. 12. Effects of molding temperature on the mechanical properties of compression-molded soy protein plastics.

FIG. 11 is an illustration of the dynamic mechanical spectra of plasticizer/composite in comparison to dry composite, moisturized composite, engineered epoxy, and polycarbonate. The engineered epoxy and polycarbonate are commercial samples used for comparative purposes. FIG. 12 is a graph depicting the effect of molding temperature on the mechanical properties of compression-molded soy protein plastics made in accordance with this invention. As shown in FIG. 12, the preferred molding temperature was about 160° C.

The present invention includes biodegradable composites, having a variety of components, said composite comprising: a plant protein component and a polycaprolactone component. The composites can further comprise a compatibilizer component.

Preferred are composites wherein the parts by weight of the components are:

plant protein 5–90 parts polycaprolactone 90–5 parts, and optionally, modified poly(ethylene terephthalate) 25–0 parts These can be modified to include:

compatibilizer 0–10 parts water 6–15 parts plasticizer 0–10 parts

Of those composites, most preferred are those wherein the parts by weight of the components are:

plant protein 50–80 parts polycaprolactone 0–20 parts, and optionally, modified poly(ethylene terephthalate) 25–0 parts These can be modified to include:

Compatibilizer 0–5 parts water 8–14 parts plasticizer 0–8 parts

Of course, composites as above, wherein the parts by weight are any within the ranges indicated are within the above preferred embodiments, including any combination or permutation of the above. The total should not exceed 100 parts.

The following table indicates sources for the components described in the present invention:

TABLE 3

| Component | Commercial Source(s) | de novo Synthesis |
| --- | --- | --- |
| plant protein | Archer Daniels Midland "ADM" (Decatur IL), Protein Technologies International, St. Louis, MO | Alkaline extraction of a defatted meal and acid precipitation. |
| polycaprolactone | Union Carbide (Summerset, NJ) | as well known in the art: Polycaprolactone is synthesized by ring-opening polymerization of (-caprolactone both in bulk and solution. A variety of compounds can be used as initiators, e.g., alkyl-aluminum, dialkylzinc, aluminum alkoxides, and stannous octoate. Some literature is as follows. R. D. Lundberg and E. F. Cox, Lactones, in Ring-opening Polymerization, Vol. 2, K. C. Frisch and S. L. Reegens, Eds, Deker, New York, 1969. R. D. Lundberg, J. V. Koleske, and W. B. Wischmann, J. Polym. Sci. A-1, 7, 2915 (1969). A. Hamilton, T. Oukadi, R. Jerome, and Ph. Teyssie, J. Polym. Sci. Chem. Ed., 15, 865 (1977). |
| modified poly(ethylene terephthalate), Biomax ® | Dupont (Old Hickory, TN) | Proprietary (patent owned by Dupont) |

Figure 13A:
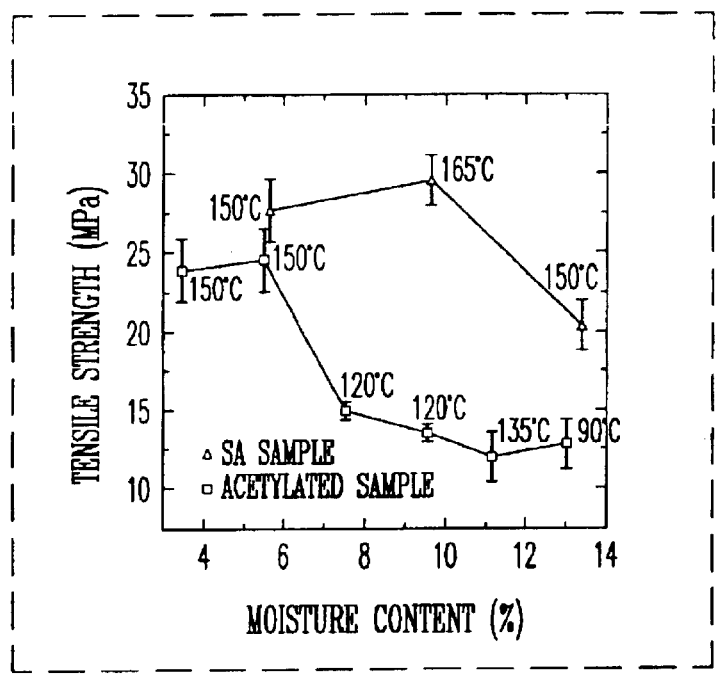
FIGS. 13A and 13B. Maximum mechanical properties obtained for specimens made from acetylated soy protein and from sodium acetate-treated soy protein (SA sample, control) at various molding temperatures.
Figure 13B:
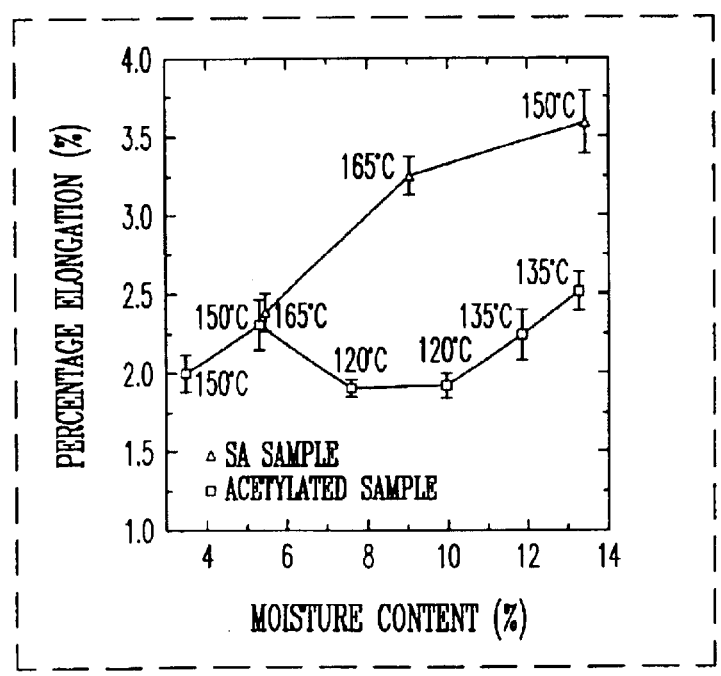

Other factors that improve the mechanical properties of the composites include chemical modification through acetylation of the protein component. The protein component may be acetylated, for example, by acetaylating an alkaline solution of the protein using acetic anhydride or acetic acid solution at room temperatures. Other various acetylation methods are well known in the art and are intended to be included within the scope of this invention. FIGS. 13A and 13B are graphs depicting the maximum mechanical properties obtained for specimens made from acetylated soy protein and from sodium acetate-treated soy protein (SA sample, control) at various optimal molding temperatures.

Cross-linking agents, such as glutaric dialdehyde and epichlorohydrin. have also been found to improve the mechanical properties of the protein composites of this invention. Other protein cross-linking agents that are suitable for use in this invention include formaldehyde, glyoxal, adipic/acetic anhydride, zinc sulfate, and calcium chloride. Persons skilled in the art can readily ascertain other appropriate cross-linking agents that are suitable for this purpose. Tables 4 and 5 below illustrate the effect of the cross-linking agents glutaric dialdehyde and epichlorohydrin on the mechanical properties of soy protein sheets produced in accordance with this invention:

TABLE 4

Effect of Glutaric Dialdehyde as Cross-Linking Agent on
Mechanical Properties of Soy Protein Sheets

| Glutar Aldeh. (parts) | Stress$_B$ (MPa) | Elong.$_B$ (%) | Strength (MPa) | Young's Modul. (MPa) | Tough. (MPa) | Water absorp %, 2 h |
|---|---|---|---|---|---|---|
| 0   | 14.1 ± 0.4 | 119 ± 12 | 14.3 ± 0.5 | 257 ± 24 | 16.0 ± 1.9 | 92 ± 2  |
| 0.1 | 15.5 ± 1.1 | 131 ± 21 | 16.3 ± 0.5 | 450 ± 82 | 19.7 ± 3.6 | 106 ± 7 |
| 0.2 | 16.2 ± 0.4 | 148 ± 16 | 16.3 ± 0.4 | 550 ± 80 | 22.2 ± 2.5 | 107 ± 8 |
| 0.4 | 16.5 ± 1.4 | 137 ± 24 | 17.3 ± 0.6 | 545 ± 45 | 21.0 ± 4.1 | 109 ± 6 |
| 0.6 | 15.6 ± 0.9 | 146 ± 8  | 15.8 ± 1.2 | 494 ± 55 | 21.0 ± 1.6 | 90 ± 3  |

TABLE 5

Effect of Epichlorohydrin as Cross-Linking Agent on
Mechanical Properties of Soy Protein Sheets

| ECH (pts) | Stress$_B$ (MPa) | Elong.$_B$ (%) | Strength (MPa) | Young's Modulus (MPa) | Toughss (MPa) | Water absorp. %, 2 h |
|---|---|---|---|---|---|---|
| 0   | 14.1 ± 0.4 | 119 ± 12 | 14.3 ± 0.5 | 257 ± 24 | 16.0 ± 1.9 | 92 ± 2  |
| 0.1 | 15.7 ± 1.0 | 107 ± 12 | 16.9 ± 0.7 | 516 ± 45 | 18.6 ± 3.1 | 110 ± 4 |
| 0.2 | 16.3 ± 0.9 | 162 ± 19 | 16.5 ± 0.7 | 533 ± 42 | 21.5 ± 2.2 | 102 ± 17 |
| 0.4 | 16.9 ± 0.3 | 162 ± 15 | 16.9 ± 0.9 | 586 ± 46 | 24.9 ± 2.0 | 102 ± 9 |

The use of protein/poly(lactic acid) blends also improve the mechanical resistance of the composites of this invention. Table 6 below illustrates the mechanical properties of various soy protein/poly(lactic acid) blends made in accordance with this invention:

TABLE 6

Comparison of Mechanical Properties of Soy Protein (SP)/Poly(lactic acid) Blends

| SP (%) | PLA[a] (%) | PEO[b] (%) | Water/ Glycerol (%) | Tensile Strength (MPa)[c] | Elongation (at break, %)[c] | Young's Modulus (MPa)[c] |
|---|---|---|---|---|---|---|
| 70[d] | 30 | 0 | 10/2 | 13.0 ± 1.1 | 2.0 ± 0.2 | 1106 ± 27 |
| 70[d] | 30 | 2 | 10/2 | 17.0 ± 0.5 | 2.3 ± 0.1 | 1094 ± 3  |
| 50[d] | 50 | 3 | 5/0  | 14.8 ± 0.9 | 3.2 ± 0.5 | 1036 ± 101 |

[a]PLA: poly(lactic acid).
[b]PEO: poly(2-ethyl-2-oxazoline).
[c]Mean ± standard deviation.
[d]Samples made by directly mixing soy protein with PLA and plasticizers
[e]Sample made by first plasticizing PLA with a commercial polyol and then blending with soy protein containing low moisture.

Biomax is a trademarked product of Dupont, of Old Hickory, Tenn. When Biomax is used, it is optimally blended with polycaprolactone (PCL) first, then the resultant resin blended with soy protein. The melting point of Biomax is high (Ca. 200° C.), and processing at such high temperature can degrade soy protein. The melting temperature is greatly decreased after Biomax is blended with PCL (the more PCL, the lower the resulting melting temperature), because the melting temperature of PCL is only about 60° C. The preferred blends of PCL with Biomax are the following two different ratios, 50/50 and 75/25. The blends showed good mechanical properties even without using a compatibilizer.

Also provided by the present invention are methods for making biodegradable soy protein composites comprising: mixing soy protein, polycaprolactone or a combination of polycaprolactone and a modified poly(ethylene terephthalate), a compatibilizer, a minimum amount of water, a plasticizer, and other additives, if desired; and subsequently extruding said mixture through a twin-screw extruder, at a temperature sufficient to make the composite extrudable. Preferred are methods wherein the temperature profile of the twin-screw extruder is 145° C. (zone next to die), 150–155° C. in the second zone, 140–145° C. in the third zone, 110° C. in the fourth zone, 75° C. (next to feeder). More preferred is a method as described wherein the screw speed is 60–70 rpm.

The composite components can be obtained as described previously. Extruders are produced under several brand names, such as Cincinnati Millicron and Wenger X-20. A suitable extruder can be obtained, for example, from List, Inc., Acton, Mass.

The temperatures used during this method can be any which allow appropriate flow of the materials, without losing the essential qualities of the composite. The extruder can be operated according to the manufacturer's instructions.

Two methods were adopted for the blending process of soy protein with synthetic polyesters. In the first method, the formulated soy protein powder (with additives) was mixed directly with synthetic polyesters, then extruded.

In the second method, the formulated soy protein (with additives) was extruded first and pelletized, then the soy protein pellets were mixed with synthetic polyesters and extruded again. If it is necessary, the soy protein pellets can be dried to contain as low as 4% moisture before it is blended with polyesters. The will result in a better compatibility between soy protein and synthetic polymers. It was found that using the second method gave blend products with better mechanical properties and better miscibility.

The present invention also includes biodegradable composites, having a variety of components, said composite comprising: a plant protein component and a N-vinyllactam polymers component. The composites can further comprise a compatibilizer component.

Preferred are composites wherein the parts by weight of the components are:

plant protein 50–100 parts poly(vinyl alcohol) 5–50 parts, and

N-vinyllactam polymer 5–10 parts

These can be modified to include:

water 50–100 parts plasticizer 0–50 parts

Of those composites, most preferred are those wherein the parts by weight of the components are:

plant protein 70–100 parts poly(vinyl alcohol) 10–30 parts, and

N-vinyllactam polymer 2–5 parts

These can be modified to include:

water 50–80 parts plasticizer 10–30 parts

Of course, composites as above, wherein the parts by weight are any within the ranges indicated are within the above preferred embodiments, including any combination or permutation of the above. The total should not exceed 100 parts.

Other ingredients may include:

Sodium tripolyphosphate (processing aide) 0.5–4 parts, preferably 1–2 parts

Ethanol or isopropanol (processing aide, texture modifiers) 0.5–2 parts, preferably 1–1.5 parts Potassium sorbate (preservative) 0.5–1 parts, preferably 0.5 parts Dyes 0.01–0.1 parts, preferably 0.01–0.05

The generic name for PVP polymers is N-vinyllactam polymers. They include poly(vinyl pyrrolidone) and its copolymers such as poly(vinyl pyrrolidone-co-vinyl acetate), poly(vinyl pyrrolidone-co-styrene), poly(vinyl pyrrolidone-co-maleic anhydride), poly(vinyl pyrrolidone-co-methyl methacrylate), poly(vinyl pyrrolidone-co-methacrylic acid) poly(vinyl pyrrolidone-co-acrylic acid), and poly(vinyl pyrrolidone-co-dimethylaminoethylmethacrylate). All of these are contemplated as part of the present invention.

The following table indicates sources for the components described in the present invention:

TABLE 7

| Component | Commercial Source(s) | de novo Synthesis |
|---|---|---|
| plant protein | Archer Daniels Midland "ADM" (Decatur IL), Protein Technologies International, St. Louis, MO | Alkaline extraction of a defatted meal and acid precipitation. |
| Poly(vinyl alcohol) and PVP | Sigma Chemical Company (St. Louis, MO) | as well known in the art: ie. Li, L., Chan, C.-M., Weng, L.-T. The effects of Specific Interactions on the Surface Structure and Composition of Miscible Blends of Poly(vinyl alcohol) and Poly(N-vinyl pyrrolidone). Polymer, 1998, 39(11) 2355. |

The protein component can be any known in the art, and be available as part of a larger formulation, such as an isolate with carbohydrates and fiber. Plant proteins which are within the scope of the present invention include any which are not water soluble, including, water-insoluble fractions from zein, corn gluten, wheat gluten, legumes, canola, sunflower, sorghum, and soybean. Any form of protein may be used; for instance, isolates, concentrates and flour are all acceptable forms of protein.

For example, soy protein may be in the form of a soy isolate containing at least 75 to 95% protein, a soy protein concentrate containing at least 50 to 70% protein, or soy flour containing at least 30 to 50% soy protein. Soy protein from soy isolates containing 95% protein, soy concentrates containing 70% protein and soy flour containing at least 50% protein are preferred. The soy protein isolate or concentrate may be prepared, for example, by alkaline extraction of a defatted meal and acid precipitation, a technique well known and used routinely in the art. Soy protein is also commercially available, for example, as Promine R (Central Soya) which is a soy protein isolate having a protein content of approximately 95 wt-%. Other soy protein products are also available from Archer Daniels Midland, Decatur Ill., and Protein Technology, St. Louis, Mo. A particularly useful brand-named soy protein from ADM is PRO-Fam 646.

In this regard, commercial soy protein (soy protein isolate, or soy concentrate, or soy flour) always contains a certain amount of water (6–9%). Before blending with other polymers, it is optimal to formulate the soy protein first. For instance, water, plasticizer and other ingredients can be added in certain parts to 100 parts of dry soy protein. For example, if the moisture in a commercial soy protein is 6%, the measurement would be 106.4 g for 100 parts. At the blending step, the soy protein (again, soy protein dry weight based on the formulated soy protein) and polymer(s) compose of 100 parts, and, to this, certain parts of compatibilizer can be added. Generally, the more synthetic polymer used, the better the water resistance and processibility. However, since synthetic biodegradable polymers are usually much more expensive, it is best to use less of them and maintain good mechanical properties.

In other embodiments, there are provided composites which further include an effective amount of a plasticizing agent to impart flexibility to the material before, during, and after mixing, and to provide flexibility, elasticity, and processibility to the formed article. The plasticizer can be any known in the art, eg. polyols and higher molecular weight alcohols, for example glycerol, glycerol monoacetate, diglycerol, glycerol diacetate or triacetate, triethylene glycol, urea, diacetin sorbitol, sorbitan, mannitol, malitol, ethylene glycol, propylene glycol, polyvinyl alcohol, sodium cellulose glycolate, cellulose methyl ether, sodium alginate, sodium diethylsuccinate, triethyl citrate, polyethylene glycols, polypropylene glycols, polyethylene propylene glycols, 1,2,6-hexanetriol, triethylamine, and mixtures thereof, with glycerol and propylene glycol being preferred. For soy protein, a range of chemicals could be used as plasticizers including glycerol, (- and (-propylene glycol, caprolactone, some short chain hydroxyl alkanoic acids such as hydroxybutanoic acid and hydroxycaproic acid, some mono-sugars and their derivatives. For PLA and modified poly(ethylene terephthalate), tone polyol(s) (low molecular weight polycaprolactone) proved to be a good plasticizer. Epoxidized oil can also be used. Both are biodegradable.

Of course, those in the art recognize that other components, such as non-soy proteins, reducing agents, fillers, extenders, bleaching agents, coloring agents, flavorings, lubricants, preservatives, foaming agents, pH modifiers or other additives may be included in the present composite so as to improve or otherwise alter the end product, as desired. U.S. patent Ser. Nos. 5,523,293 and 5,710,190 describe such modifications, and are herein incorporated by reference.

Also provided by the present invention are methods for making biodegradable soy protein composites comprising: mixing soy protein, polycaprolactone or a combination of polycaprolactone and a modified poly(ethylene terephthalate), a compatibilizer, a minimum amount of water, a plasticizer, and other additives, if desired; and subsequently extruding said mixture through a twin-screw extruder, at a temperature sufficient to make the composite extrudable. Preferred are methods wherein the temperature profile of the twin-screw extruder is 145° C. (zone next to die), 150–155° C. in the second zone, 140–145° C. in the third zone, 110° C. in the fourth zone, 75° C. (next to feeder). More preferred is a method as described wherein the screw speed is 60–70 rpm.

The composite components can be obtained as described previously. Extruders are produced under several brand names, such as Cincinnati Millicron and Wenger X-20. A suitable extruder can be obtained, for example, from List, Inc., Acton, Mass.

The temperatures used during this method can be any which allow appropriate flow of the materials, without losing the essential qualities of the composite. 100 degrees Celsius is ideal, but any temperature between approximately 95 and approximately 125 will work. The extruder can be operated according to the manufacturer's instructions.

Polylactide Blend Examples

Materials

SPI was obtained from Protein Technologies International, St. Louis, Mo., and was used as received. SPC and SF were obtained from ADM, and were used as received. PLA was obtained from Cargill Dow Polymers (Minneapolis, Minn.). Poly(2-ethyl-2-oxazoline) (MW 500,000) was purchased from Aldrich. All other chemical reagents used were reagent grade and were obtained from commercial sources.

Formulation

To a 100 part of SP (dry wt.) was added 0.5 parts of sodium sulfite, 1 part of sodium tripolyphosphate, 0.5–0.8 parts of an internal lubricant, 8–13 parts of water and 2–8 parts of glycerol and other additives while mixing. The amount of each additive added was determined by the requirement of the final products. The above SP formulation was mixed with PEOX (supplied in coarse powder form) and PLA pellets.

Extrusion Compounding

Compounding was performed in a Leistritz 18 twin-screw co-rotating extruder (Leistritz Micro 18, American Leistritz Co., Sommerville, N.J.). The extruder is divided into five heating zones for temperature control. The temperature profile of the twin-screw extruder heating zones was 145° C. (zone next to die), 150–155° C., 140–145° C., 100° C., 75° C. (next to feeder), and the screw speed was 60–70 rpm. A 3 mm diameter die was attached to the end of extruder, and its temperature was 140° C. The extrudate was pelletized and the moisture content was determined.

Injection Molding

Injection molding was performed on a Boy-22S Dipronic injection molder (Boy Machines Inc., Exton, Pa.), with a L/D ratio of 18. The barrel was divided into two heating zones. The temperature was set up at 144–157° C. (nozzle), 135–145° C. (zone 2), 120–130° C. (zone 1). The mold temperature was 230° C., screw speed 250 rpm, and injection pressure 2050 psi Physical properties Mechanical properties of the injection molded tensile bars were determined using an Instron Universal Testing Machine (model 4502, Instron Co., Canton, Mass.) by following the ASTM D638. Water absorption was conducted by immersion method following ASTM D570–81. The water uptake at 2-hour and 24-hour was calculated. Thermal properties were measured by DSC, DMA, and TGA.

Polycaprolactone Blend Examples

Materials

Soy protein isolate (SPI) was obtained from Protein Technologies International, St. Louis, Mo., and was used as received. Soy protein concentrate (SPC) and soy flour (SF) were obtained from ADM, and were used as received. PCL was obtained from Union Carbide (Summerset, N.J.), and Biomax from Du Pont. Poly(2-ethyl-2-oxazoline) (MW 500,000) was purchased from Aldrich. All other chemical reagents used were reagent grade and were obtained from commercial sources.

Compounding of Biomax and PCL Blends

Compounding was performed in a Leistritz 18 twin-screw co-rotating extruder (Leistritz Micro 18, American Leistritz Co., Sommerville, N.J.). The extruder is divided into five heating zones for temperature control. The temperature profile of the twin-screw extruder heating zones was 178° C. (zone next to die), 205° C., 200° C., 120° C., 60° C. (zone next to feeder), and the screw speed was 70 rpm. A 3-mm diameter die was attached to the end of extruder, and its temperature was 155° C. The extrudate was pelletized and the moisture content was determined.

Formulation

To a 100 part of SP (dry wt.) was added 0.5 parts of sodium sulfite, 1 part of sodium tripolyphosphate, 0.5–0.8 parts of an internal lubricant, 10–13 parts of water and 2–8 parts of glycerol and other additives while mixing. The amount of each additive added was determined by the requirement of the final products. The above SP formulation was mixed with PEOX and Biomax/PCL pellets.

Compounding of Soy Blends

The temperature profile of the twin-screw extruder heating zones was 145° C. (zone next to die), 150–155° C., 140–145° C., 110° C., 75° C. (zone next to feeder), and the screw speed was 60–70 rpm. A 3-mm diameter die was attached to the end of extruder, and its temperature was 140° C. The extrudate was pelletized and the moisture content was determined.

Injection Molding

Injection molding was performed on a Boy-22S Dipronic injection molder (Boy Machines Inc., Exton, Pa.), with a L/D ratio of 18. The barrel was divided into two heating zones. The temperature was set up at 150–157° C. (nozzle), 150–160° C. (zone 2), 130–140° C. (zone 1). The mold temperature was 23° C., screw speed 250 rpm, and injection pressure 2050 psi.

Physical Properties

Mechanical properties of the injection molded tensile bars were determined using an Instron Universal Testing Machine (model 4502, Instron Co., Canton, Mass.) by following the ASTM D638. Water absorption was conducted by immersion method following ASTM D570-81. The water uptake at 2-hour and 24-hour was calculated. Thermal properties were measured by DSC, DMA, and TGA.

Poly(vinyl alcohol) Blend Examples

Materials

Soy protein isolate (SPI, Supro 760) was obtained from Protein technology International, St. Louis, Mo. Reagent grade chemicals such as glycerol and salts were obtained from commercial sources. Poly(vinyl alcohol) (PVA, MW 70,000–10000, 90% hydrolyzed) and polyvinylpyrrolidone (PVP, MW 360,000) were obtained from Sigma Chemical Company.

Formulation

Soy protein and PVA can be combined in different proportions to give materials with different physical properties. Below is an example of typical formulation procedure used to make soy protein foams. Soy protein isolate (100 parts dry weight) was placed in a high-speed mixer (Henschel Mixers American, Inc. Houston, Tex.). A slurry containing water (80 parts) glycerol (30 parts), sodium tripolyphosphate (1 part) and poly(vinyl alcohol) (2 parts) was introduced while mixing. The formulation was mixed thoroughly for a few minutes and then left overnight before compounding and extrusion to make the pellets. Compounding and extrusion was carried out in a twin screw co-rotating extruder (Leistritz Micro 18, American Leistritz Corp., Sommerville, N.J.), equipped with an auto feeder. The process was executed at about 130° C. and a speed of 150 rpm. The extrudate that came out did not form a continuous strand. It however crushed in the high-speed mixer to give flakes that were used in a Brabender extrusion. Formulations that contained polyvinylpyrrolidone gave continuous strands that could be easily pelletized.

Extrusion of Soy Protein/PVA Foam Sheets

The flakes or pellets were processed in a single screw Brabender extruder (C.W. Brabender Instruments, Inc., Hackensack, N.J.) with a six-inch flat sheet die. The processing was done at 150–160° C. The foam sheet was drawn using a Brabender take-off unit.

Physical Properties

Mechanical properties of the sheets were determined using an Instron Universal Testing Machine (model 4502, Instron Corp. Canton, Mass.). The analysis was done using the method, ASTM D882-91. The bulk densities of the foams were obtained by displacement method using amaranth seeds.

Results

TABLE 8

Physical properties of SPI foam sheet

| Sample | Density (g/cc) | Tensile strength (MPa) | Elongation (%) | Young's modulus (MPa) |
|---|---|---|---|---|
| Control | 0.53 | 6.47 ± 0.56 | 7.67 ± 1.61 | 164.90 ± 49.60 |
| PVA2 | 0.61 | 4.70 ± 0.37 | 23.39 ± 5.09 | 125.30 ± 33.33 |
| PVA3 | 0.47 | 5.72 ± 0.55 | 28.13 ± 12.05 | 153.00 ± 33.43 |
| PVA2/PVP2 | 0.47 | 7.61 ± 0.64 | 8.48 ± 0.82 | 178.70 ± 25.40 |
| PVA10/PVP3 | 0.52 | 6.95 ± 0.75 | 15.22 ± 3.46 | 161.00 ± 24.20 |

PVA2 contains 2 parts PVA, PVA3 contains 3 parts PVA, PVA2/PVP2 = PVA:PVP, 2:2 parts PVA10/PVP3 = PVA:PVP, 10:3 parts. Data is ± standard deviation.

Extruded foam sheets generally have densities in the range of 0.3–0.6 g/cc. They have open-cell structures as opposed to closed cell in compression molded foams, and have been found to have higher strength, elongation, and moduli than those of compression molded foams. Glycerol has been found to be the most compatible with soy protein in the extrusion process.

Figure 14:
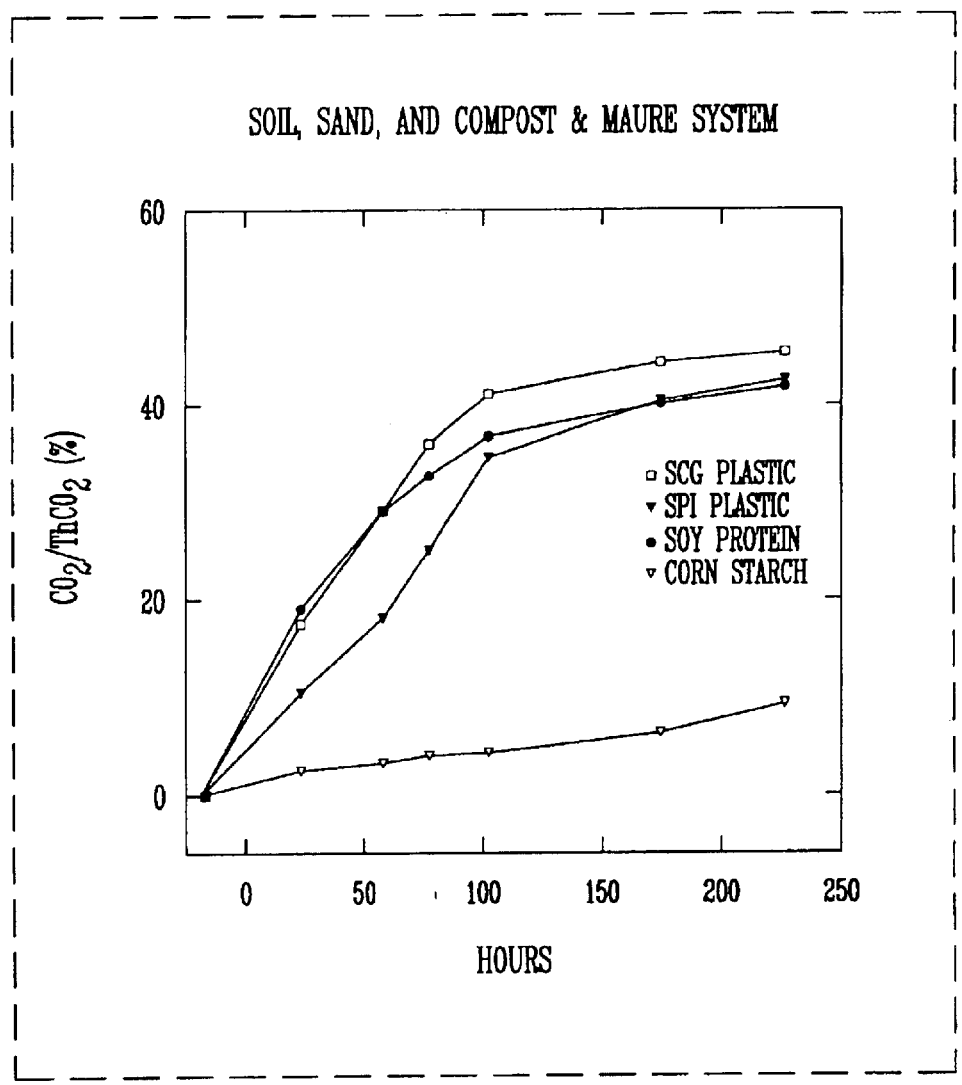
FIG. 14. Percent evolution of $CO_2$ by the composites of this invention over time in a soil, sand, compost, and manure system.

The inventors have also demonstrated that the plant protein are biodegradable by monitoring the evolution of carbon dioxide when samples were subjected to soil, sand, compost, and manure systems, as well as from marine systems. Attached as FIG. 14 is a graph illustrating the percent of carbon dioxide released relative to theoretical $CO_2$ ($ThCO_2$) from these systems using the composites of this invention (Soy protein/starch/glycerol, SCG plastic,) versus control. FIG. 14 demonstrates that Applicant's plant protein composites are highly biodegradable as shown by the high amount of $CO_2$ produced.

Although the present invention has been fully described herein, it is to be noted that various changes and modifications are apparent to those skilled in the art. Such changes and modifications are to be understood as included within the scope of the present invention as defined by the appended claims.

What is claimed is:

1. A non-toxic biodegradable plant protein composite, said composite comprising: 5 to 90 parts by weight soy protein; and 90 to 5 parts by weight of a polylactide, wherein said composite total does not exceed 100 parts.

2. The plant protein composite of claim 1 wherein the composite includes at least 25% by weight of the polylactide.

3. The plant protein composite of claim 1 wherein the composite includes at least 50% by weight of the polylactide.

4. The plant protein composite of claim 1 further including a compatibilizer, said compatibilizer being selected from the group consisting of a poly(2-alkyl-2-oxazoline), a poly (2-phenyl-2-oxazoline), and an epoxy/hydroxyl functionalized polybutadiene.

5. The plant protein composite of claim 4 wherein the poly(2-alkyl-2-oxazoline) is selected from the group consisting of poly(2-methyl-2-oxazoline), poly(2-ethyl-2-oxazoline), and poly(2-propionyl-2-oxazoline).

6. The plant protein composite of claim 5 wherein the poly(2-alkyl-2-oxazoline) is poly(2-ethyl-2-oxazoline).

7. The plant protein composite of claim 4 wherein the composite contains 2 parts by weight compatibilizer.

8. The plant protein composite of claim 1 wherein the plant protein is acetylated.

9. The plant protein composite of claim 1 further including a cross-linking agent.

10. The plant protein composite of claim 9 wherein the cross-linking agent is selected from the group consisting of glutaric dialdehyde, epichlorohydrin, formaldehyde, glyoxal, adipic anhydride, acetic anhydride, zinc sulfate, and calcium chloride.

11. The plant protein composite of claim 10 wherein the cross-linking agent is glutaric dialdehyde or epichlorohydrin.

12. The plant protein composite of claim 10 which includes up to about 0.6 parts by weight glutaric dialdehyde.

13. The plant protein composite of claim 10 which includes up to about 0.4 parts by weight epichlorohydrin.

14. The plant protein composite of claim 1 which further includes a plasticizer, said plasticizer being selected from the group consisting of up to 50% by weight glycerol and up to 30% by weight propylene glycol.

15. The plant protein composite of claim 14 which includes 10–30% by weight glycerol.

16. The plant protein composite of claim 14 which includes 10–20% by weight propylene glycol.

17. A method for making a biodegradable plant protein composite comprising: combining 5 to 90 parts by weight plant protein with 90 to 5 parts by weight polylactide to form a mixture; and extruding said mixture at a temperature sufficient to make the mixture extrudable; wherein said composite total does not exceed 100 parts.

18. The method of claim 17 wherein the plant protein is soy protein.

19. The method of claim 17 further comprising adding a compatibilizer to the mixture.

20. The method of claim 17 further comprising adding a cross-linking agent to the mixture.

21. The method of claim 17 further comprising adding a plasticizer to the mixture.

22. A non-toxic biodegradable plant protein composite comprising: soy protein; at least 25% by weight of a polylactide; up to 10 parts by weight of a compatibilizer, said compatibilizer being selected from the group consisting of a poly(2-alkyl-2-oxazoline) and a poly(2-phenyl-2-oxazoline); up to 0.6 parts by weight of a cross-linking agent, said cross-linking agent being selected from the group consisting of glutaric dialdehyde and epichlorohydrin; and up to 40% by weight of a plasticizer, said plasticizer being selected from the group consisting of glycerol and propylene glycol.

* * * * *